(12) United States Patent
Sandoval et al.

(10) Patent No.: US 11,914,699 B2
(45) Date of Patent: *Feb. 27, 2024

(54) RESTRICTING ACCESS TO APPLICATION PROGRAMMING INTERFACES (APIS)

(71) Applicant: Open Text Inc., Menlo Park, CA (US)

(72) Inventors: Andrew L. Sandoval, San Antonio, TX (US); John R. Shaw, II, Broomfield, CO (US)

(73) Assignee: Open Text Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,258

(22) Filed: Apr. 12, 2021

(65) Prior Publication Data

US 2021/0232674 A1 Jul. 29, 2021

Related U.S. Application Data (63) Continuation of application No. 16/108,579, filed on Aug. 22, 2018, now Pat. No. 11,030,302.

(60) Provisional application No. 62/656,722, filed on Apr. 12, 2018.

(51) Int. Cl.
*G06F 21/51* (2013.01)
*G06F 9/54* (2006.01)
*G06F 21/62* (2013.01)
*G06F 21/52* (2013.01)

(52) U.S. Cl.
CPC .............. *G06F 21/51* (2013.01); *G06F 9/54* (2013.01); *G06F 21/52* (2013.01); *G06F 21/629* (2013.01)

(58) Field of Classification Search
CPC .................................. G06F 21/51; G06F 9/54
See application file for complete search history.

(56) References Cited

U.S. PATENT DOCUMENTS

| 7,475,431 | B2 * | 1/2009 | Chao | G06F 21/52 |
| | | | | 718/1 |
| 7,546,587 | B2 * | 6/2009 | Marr | G06F 21/606 |
| | | | | 717/124 |
| 8,799,928 | B1 * | 8/2014 | Papakipos | G06F 21/51 |
| | | | | 719/318 |
| 8,925,053 | B1 * | 12/2014 | Mehta | G06F 21/31 |
| | | | | 726/4 |
| 9,009,856 | B2 * | 4/2015 | Draluk | G06F 21/51 |
| | | | | 726/30 |

(Continued)

*Primary Examiner* — Viral S Lakhia
(74) *Attorney, Agent, or Firm* — Sprinkle IP Law Group (57) ABSTRACT Examples of the present disclosure describe systems and methods for restricting access to application programming interfaces (APIs). For example, when a process calls an API, the API call may be intercepted by a security system for evaluation of its trustfulness before the API is allowed to run. Upon intercepting an API call, the process calling the API may be evaluated to determine if the process is known to the security system, such that known processes that are untrusted may be blocked from calling the API. Further, when the security system cannot identify the process calling the API, the security service may evaluate a call stack associated with the call operation to determine if attributes of the call operation are known to the security system. If the call operation is known to the security system as untrusted, the call operation may be blocked from calling the API.

23 Claims, 5 Drawing Sheets

(56) References Cited

U.S. PATENT DOCUMENTS

| | | | |
|---|---|---|---|
| 9,147,086 B1 ‡ | 9/2015 | Potlapally | G06F 21/64 |
| 9,256,730 B2 * | 2/2016 | Wicherski | G06F 21/554 |
| 9,294,456 B1 * | 3/2016 | Timmermans | H04L 63/083 |
| 9,558,348 B1 * | 1/2017 | Muttik | G06Q 50/00 |
| 10,013,458 B2 * | 7/2018 | Gordon | G06F 16/9024 |
| 10,104,237 B1 * | 10/2018 | Amin | H04L 65/102 |
| 10,122,689 B2 ‡ | 11/2018 | MacCarthaigh | H04L 63/062 |
| 10,387,627 B2 ‡ | 8/2019 | Johnson | G06F 21/10 |
| 10,454,903 B2 ‡ | 10/2019 | Neal | H04L 9/0891 |
| 10,528,721 B2 * | 1/2020 | Sood | G06F 9/45558 |
| 10,656,885 B2 * | 5/2020 | Hamlen | G06F 21/52 |
| 10,681,071 B1 * | 6/2020 | Pendergast | H04L 63/1458 |
| 10,831,743 B2 * | 11/2020 | Hornsby | G06F 16/24578 |
| 10,997,654 B1 * | 5/2021 | Sahni | G06Q 40/02 |
| 11,256,791 B2 * | 2/2022 | Douglas | G06V 40/70 |
| 11,544,379 B2 * | 1/2023 | Sandoval | G06F 21/52 |
| 11,669,839 B2 * | 6/2023 | Wiseman | G06F 21/31 705/44 |
| 2007/0050848 A1 * | 3/2007 | Khalid | G06F 21/52 713/188 |
| 2014/0096184 A1 ‡ | 4/2014 | Zaitsev | G06F 21/577 726/1 |
| 2014/0130150 A1 * | 5/2014 | Moshchuk | G06F 11/30 726/22 |
| 2014/0164768 A1 * | 6/2014 | Kruglick | H04L 63/062 713/168 |
| 2015/0154418 A1 * | 6/2015 | Redberg | G06F 16/148 713/165 |
| 2016/0285858 A1 ‡ | 9/2016 | Li | H04L 63/0815 |
| 2016/0371484 A1 * | 12/2016 | Mehta | G06F 21/52 |
| 2017/0048253 A1 * | 2/2017 | Anton | H04L 63/20 |
| 2017/0091428 A1 * | 3/2017 | Johnson | G06F 21/10 |
| 2017/0230402 A1 ‡ | 8/2017 | Greenspan | H04L 63/1425 |
| 2018/0084368 A1 * | 3/2018 | Chadli | H04L 67/02 |
| 2018/0114012 A1 * | 4/2018 | Sood | G06F 21/79 |
| 2018/0268127 A1 ‡ | 9/2018 | Poeluev | G06F 21/53 |
| 2018/0309583 A1 ‡ | 10/2018 | Bate | G06F 21/54 |
| 2019/0180033 A1 ‡ | 6/2019 | Born | G06F 16/16 |
| 2019/0312874 A1 * | 10/2019 | Chinnathambi | G06F 21/51 |

\* cited by examiner
‡ imported from a related application

RESTRICTING ACCESS TO APPLICATION PROGRAMMING INTERFACES (APIS)

CROSS-REFERENCE TO RELATED APPLICATION

This application is a continuation of, and claims a benefit of priority under 35 U.S.C. 120 of, U.S. patent application Ser. No. 16/108,579 filed Aug. 22, 2018, issued as U.S. Pat. No. 11,030,302, entitled "Restricting Access to Application Programming Interfaces (APIs)", which claims priority to U.S. Provisional Application No. 62/656,722 filed Apr. 12, 2018, entitled "Restricting Access to Application Programming Interfaces (APIs)," the entire disclosure of which is hereby incorporated by reference in its entirety.

BACKGROUND

A malicious program, such as ransomware and malware, may attack a computing device by searching the file system for documents, photos, and/or other files of interest. Once such files are found, the malicious program may encrypt the files to block access for the user and/or copy the files to obtain information about the user. In examples, a ransom payment may be extracted from the user. Computer security programs may provide protection from such security threats, however such programs typically only perform a signature check on malicious programs, which may generally only catch known threats.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for restricting access to application programming interfaces (APIs). For example, when a process calls an API on an operating system, the API call may be intercepted by a security system for evaluation of a trust level of the process before the API is allowed to run. In an aspect, API hooks may be placed on APIs used to find files on the operating system. Upon intercepting an API call, the process calling the API may be evaluated to determine if the process is known to the security system. In some examples, if the process calling the API is known or determined to be untrustworthy, the process may be blocked from calling the API.

In further examples, when the security system cannot identify the process calling the API, the security service may evaluate a call stack associated with the process to determine if attributes of the call operation are known to the security system. For example, one or more call stack attributes (e.g., return addresses, call instructions, pointers, etc.), security certificates, and the like, may be used to determine a trust level for the process calling the API. In some examples, if the process is known to the security system as untrustworthy, the call operation may be blocked from running the API. In other examples, if the process calling the API is unknown to the security system, the call operation may also be blocked from running the API.

In aspects, when the process is blocked from running an API, a prompt may be generated so that a user may provide an indication as to whether the process should be permitted to complete the API call, if it is so desired. As a result, malicious programs are restricted from calling APIs that may expose user files to malicious- and/or exploit-like activities. Furthermore, by first evaluating whether the process is known to be trustworthy, the number of false-positives that may be generated by the security system are limited or reduced, thereby increasing the ease of use for the user and improving the overall user experience. Additionally, by evaluating the underlying call operation associated with the process, even potentially malicious processes that may otherwise be unknown to the security system may be identified and blocked, thereby improving user protection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Generally, modern operating systems spend the majority of the time executing code and operational processes in either kernel mode or user mode. Kernel mode may generally be reserved for trusted core operating system components and functions. Accordingly, the code and operational processes executed in kernel mode may be permitted unrestricted access to CPU instructions, memory addresses, and underlying hardware. User mode may generally be reserved for untrusted (or semi-trusted) applications and services. In user mode, the code and operational processes may not be permitted to directly access the CPU instructions, memory addresses, and underlying hardware. Rather, the applications and services may instead use application programming interfaces (APIs) and/or memory sharing techniques to access the hardware, memory addresses, and other functionality.

In examples, APIs are typically a set of commands, routines, functions, protocols, data structures, objects, and remote calls associated with an operating system that enable applications and services to access common operations within the underlying computing system. For example, an API may be directed to file searching functions, file access functions, etc., such that, when called, the API may search a directory for a first file or a subdirectory with a name that matches a specific name (or, in some instances, a partial name if wildcards are used). If the function succeeds, the return valve of the API call may be a search handle, which may be used in a subsequent API call (such as a find next file searching function) and may contain information about the first file or directory found. Some malicious programs, such as ransomware and malware, may operate by calling such file search APIs in order to search one or more file systems for documents, photos, and/or any other files of interest. These malicious programs may conduct hundreds or even thousands of such file searches to identify files to encrypt and/or copy. As an example, the malicious program may call an API directed to a file searching function, and may search for one or more directories or paths using a file name search that may include a wildcard character, for example, an asterisk (*), a question mark (?), or the like.

Accordingly, the present disclosure describes systems and methods for restricting the use of such APIs. In an example, a security service may monitor calls to one or more APIs and may evaluate a trust level of a process making calls to the API in order to determine whether the API should be blocked from being called by the process. In an example, a "trusted" process may be allowed to call the API, while an "untrusted" process may be blocked from calling the API. This enables blocking untrusted processes from calling APIs that may be used to identify, access, or manipulate user data, among other actions. In aspects, the security service may place API hooks on APIs that may be used to find files on the operating system (e.g., FindFirstFile, FindFirstFileEx, and the like). In examples, such an API may be referred to as a "file finding function." For example, the API hooks may be placed for processes running in the user mode of the operating system, such that calls to file search APIs by such processes may be evaluated before the APIs calls are permitted to execute. In some examples, if a call to a file search API includes a wildcard, then the call may be intercepted and subjected to further evaluation. In an example, the intercepted call may be evaluated to determine a trust level for the process that called the API. As an example, a process may be an application (e.g., an executable application, a web-based application, a server and/or client application), a plugin, or a module, etc., which may be executed by a processing device. By intercepting an API call before the API call is executed, untrusted programs may be prevented from engaging in exploit-like behavior and accessing user files. In another example, the API hooks may be placed at a lower level of the operating system, for example, on APIs the kernel mode and the query information file level, in order to monitor and intercept API calls. While example APIs and/or file finding functions are discussed herein, it will be appreciated similar techniques may be used for other APIs.

Evaluating the trust level may include identifying whether the process is a "known" process based on one or more process attributes (e.g., name, hash, cryptographic signature, or other identifier). For example, once a process calling an API is identified, the process may be compared to a list of known processes to determine a trust level for the process (e.g., trusted or untrusted based on the categorization of the process). Accordingly, known trusted processes may be allowed to call the API, while known untrusted processes may be blocked from calling the API. However, in an example with an "unknown" process, the trust level of the process may be further evaluated by determining whether the underlying call operation is a "known" call operation based one or more call stack attributes (e.g., return addresses, call instructions, pointers, etc.), security certificates, and the like. For example, once the call operation is identified, the call operation may be compared to a list of known call operations to determine the trust level of the call operation (e.g., whether the call operation is trusted or untrusted based on the categorization of the call operation). Known trusted call operations may be allowed to call the API, while known untrusted call operation may be blocked from calling the API. Further, "unknown" call operations may also be blocked from calling the API. Examples of untrusted processes and/or call operations may be malware and ransomware, although it is appreciated that aspects disclosed herein may be applied to any other undesirable operational process and/or call operation. Further, while the terms trusted and untrusted are used herein, it will be appreciated that a trust level may be defined in any of a variety of ways. For example, a trust level may comprise a score, such that a score above a certain threshold may indicate a trusted process, while a score below the threshold may indicate an untrusted process.

In examples, if the process calling the API is blocked (e.g., as a result of having an untrusted trust level), the user may be prompted as to whether the security service's blocking of the API call should be overridden, thereby allowing the process to call the API. For example, if a user indication is received by the prompt that the blocked call is confirmed (e.g., that the process should not be permitted to call the API), the security service may terminate the process and report the process back to the security service for further evaluation. However, if a user indication is received indicating that the process should be allowed to call the API, the process and/or aspects of the call operation (e.g., return addresses, call instructions, pointers, security certificates, etc.) may be whitelisted, such that the process may be marked as trusted for future API calls and may be allowed without any future prompts. In another example, the user indication may indicate that the process should be permitted to call the API once, such that subsequent calls by the process to the API may be subject to a similar evaluation as discussed above. In some examples, an informational indication may be presented to the user, such that the user may be informed that the process was blocked. In other examples, the process may be blocked automatically (e.g., without the receipt of user input). It will be appreciated that aspects described herein may be performed automatically, with manual input, or any combination thereof.

Figure 1:
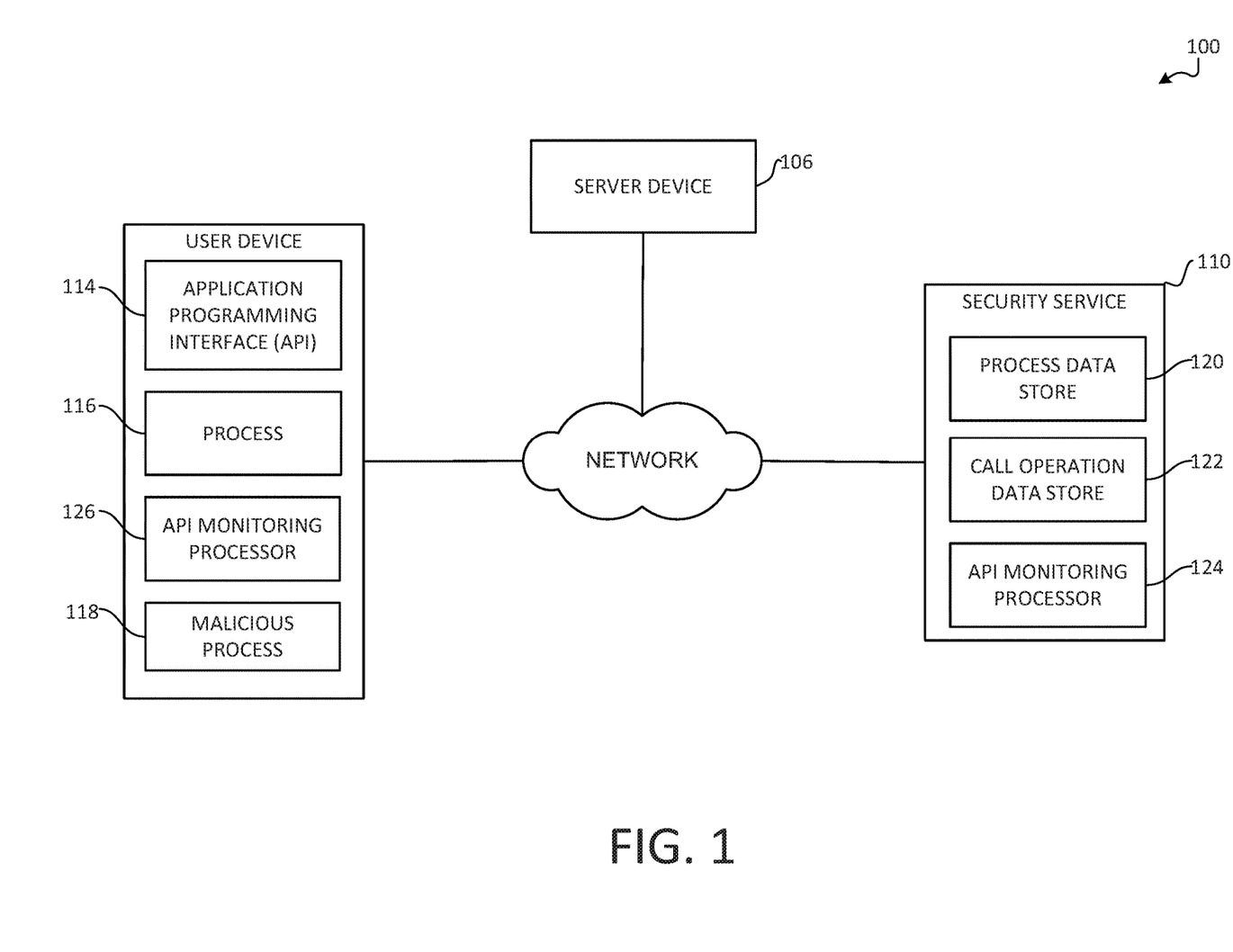
FIG. 1 illustrates an overview of an example system for restricting use of an application programming interface (API) as described herein.

FIG. 1 illustrates an overview of an example system 100 for restricting use of an API. Example system 100 is a combination of interdependent components that interact to form an integrated whole. Components of the systems may be hardware components or software implemented on and/or executed by hardware components of the systems. In examples, system 100 may include any of hardware components (e.g., used to execute/run operating systems, and software components (e.g., applications, APIs) modules, virtual machines, runtime libraries, etc.) running on hardware. In one example, an example system 100 may provide an environment for software components to run, obey constraints set for operating, and utilize resources or facilities of the system 100, where components may be software (e.g., applications, programs, modules, or other processes) running on one or more processing devices. For instance, software may run on a processing device such as a computer, mobile device (e.g., smartphone/phone, tablet, laptop, personal digital assistant (PDA), etc.) and/or any other electronic devices. For an example of a processing device operating environment, refer to the example aspects depicted in FIG. 5 and the associated description below. In other examples, the components of systems disclosed herein may be spread across multiple devices.

As illustrated, system 100 may include a user device 102, a server device 106, a malicious device 108, and a security service 110, all of which may be connected via a network 112. In an example, network 112 may facilitate wired and/or wireless communication between entities 102-110. In some examples, network 112 may include a local area network, a wide area network, a virtual private network, and/or the Internet. In other examples, network 112 may include one or more networking devices, such as, but not limited to, a router, a managed or unmanaged switch, a gateway, a modem, an access point, or a firewall.

User device 102 may be any of a variety of computing devices, including, but not limited to, mobile computing devices, tablet computing devices, desktop computing devices, and/or laptop computing devices. In examples, user device 102 may include an operating system having one or more APIs 114 that enable processes 116, 118 (e.g., applications and/or services) to access the underlying hardware, memory addresses, and other functionality of user device 102. For example, APIs 114 may be the interfaces that are directed to file searching functions on the user operating system, including but not limited to, FindFirstFile, FindFirstFileEx, and the like. It is appreciated that while file searching APIs are described herein, APIs 114 may be any of a variety of functional APIs as required or desired. In aspects, process 116 may be associated with a file-save-as dialog, which routinely calls API 114 and would be considered trustworthy, such that security service 110 should not restrict use of it. By contrast, malicious process 118 may call the API 114 and attempt to maliciously access and exploit files on user device 102. In examples, malicious process 118 may comprise software instructions to encrypt files and/or send data back to a malicious device through network 112. As such, unlike process 116 being a trustworthy dialog on user device 102, malicious process 118 would be considered untrustworthy such that security service 110 may restrict the use of it on user device 102.

Security service 110 may facilitate the monitoring and/or analysis of one or more APIs (e.g., the API 114) of user device 102. As illustrated, security service 110 may include a process data store 120, a call operation data store 122, and an API monitoring processor 124. It is appreciated that while security service 110 is illustrated as including elements 120-124, fewer, additional, or alternative elements may be used. In some examples, security service 110 may be a computing device, or may be multiple computing devices. In other examples, the functionally discussed herein with respect to one or more of components 120-124 may be distributed among other devices of system 100 (e.g., devices 102-106). In an example, at least some aspects of security service 100 may be local to devices 102-106 (e.g., on the same local network, provided using the same computing resources, etc.), such as API monitoring processor 126 on user device 102. In another example, at least some aspects of security service 110 may be remote (e.g., provided by a remote data center, as a cloud service, etc.).

Process data store 120 may store historical information relating to attributes for one or more processes that are known to security service 110. As an example, process data store 120 may store trust level information (e.g., trusted or untrusted, scores, etc.) associated with the known processes (e.g., by name or any other identifier). In some examples, information from process data store 120 may be evaluated when determining a trust level of processes 116, 118 attempting to call API 114. For example, process 116 may be associated with a "trusted" level by security service 110, while process 118 may be associated with an "untrusted" level. The historical information within process data store 120 may be updated as required or desired by security service 110, so that more recent and current security threats may be accounted for and protected against by the service.

Similarly, call operation data store 122 may store historical information relating to attributes of call operations used by unknown processes that call API 114 of user device 102. As an example, even if the processes 116, 118 are unknown to security service 110, the underlying executable code can be evaluated for a trust level based at least in part on information stored by call operation data store 122. This enables even unknown processes to be evaluated for their trust level, thereby increasing security for the user. As an example, call operation data store 122 may store information associated with call stack attributes, security certificates, and the like associated with call operations of trusted and untrusted processes. In some examples, information from call operation data store 122 may be evaluated when determining a trust level for process 116, 118 when attempting to call API 114, based on comparing attributes of the call operation to known trusted and untrusted call operation attributes. The information within call operation data store 122 may be updated as required or desired by security service 110 and/or user device 102, so that more recent and current security threats may be accounted for and protected against by the service.

As illustrated, security service 110 further includes API monitoring processor 124. In some examples, API monitoring processor 124 of the security service 110 may be used in conjunction with the local API monitoring processor 126 on user device 102 in order to intercept and evaluate a call from process 116, 118 to API 114. In another example, certain aspects described above with respect to local API monitoring processor 126 may be performed by security service 110 using API monitoring processor 124, such that at least a part of the evaluation may be performed remote from user device 102.

To evaluate the trust level of the process 116, 118, API monitoring processer 126 may compare one or more attributes of processes 116, 118 calling API 114 to the list of known processes (e.g., as may be stored by or accessed from process data store 120) in order to determine a level of trust of the process. For example, process 116 may be trusted, while process 118 may be untrusted. At least a part of the information may be cached or stored locally by user device 102. In an example where processes 116, 118 are unknown, API monitoring processor 126 may compare one or more attributes of a call operation associated with the process to known call operation attributes (e.g., as may be stored by or accessed from call operation data store 122) to determine a level of trust for the call operation. Based on the level of trust associated with the process 116, 118 and/or call operations, API monitoring process 126 may block and terminate, or allow, the API call from the process 116, 118 as described herein. In some examples, if the process is unknown and it is still allowed to call the API, one or more attributes associated with the call operation may be stored by call operation data store 122, such that the process may be allowed to call API 114 by security service 110 during future use.

Figure 2:
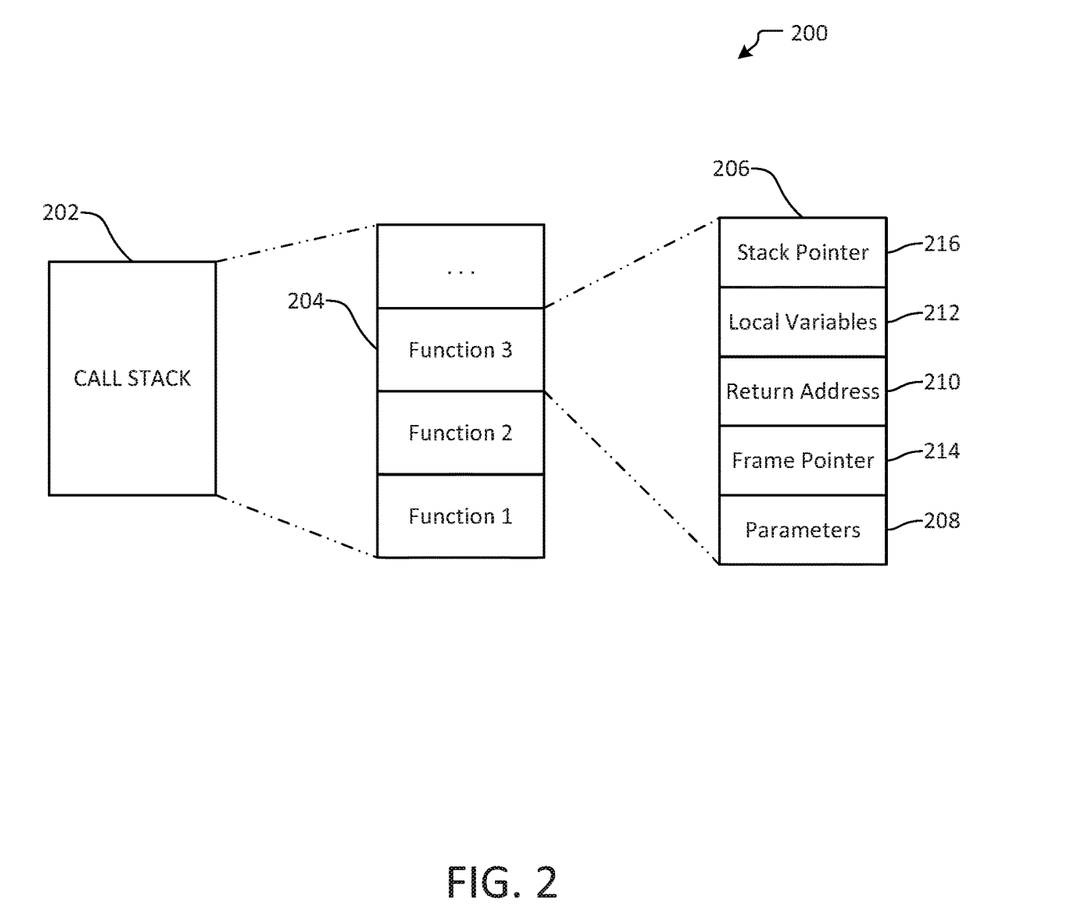
FIG. 2 illustrates an overview of an example call stack.

FIG. 2 illustrates an overview of an example call operation 200. In an example, call operation 200 may include a call stack 202 used to store information about active subroutines or functions 204 (e.g., as may be performed by processes 116, 118 in FIG. 1) and to keep track of the point to which each active function should return control when execution is finished. For example, one of functions 204 may be directed to initiate a search file API, which may return the search results back to the process for further use. Each function 204 may be composed of a stack frame 206 that includes data structures containing function state information. In some examples, stack frame 206 includes one or more parameters 208 that are passed to function 204, a return address 210 back to the function's caller, and any local variables 212 generated by function 204. Additionally, stack frame 206 may include a frame pointer 214 and a stack pointer 216 such that the location of stack frame 206 within call stack 202 can be mapped.

In aspects, call stack 202 may include attributes that are associated with each function 204, such as, but not limited to, a function name, a programming language, and parameter names, types, and values. As such, by analyzing call stack 202, a trust level of a process performing call operation 200 may be determined. In some examples, one of parameters 208 may be analyzed to determine if it includes a wildcard that may be used for the search file API, given that, in some examples, a malicious process may utilize such a parameter. In another example, return address 210 may be analyzed to determine the address to which execution will return after the API call, such that a trust level may be determined based on the return address. In other examples, one or more script interpreters (e.g., POWERSHELL, PYTHON, VBSCRIPT, BASH, etc.) may be analyzed to determine if they are the type that are commonly used by potentially malicious processes. In another example, one or more security certificates associated with the process may be analyzed when determining the trust level.

Figure 3:
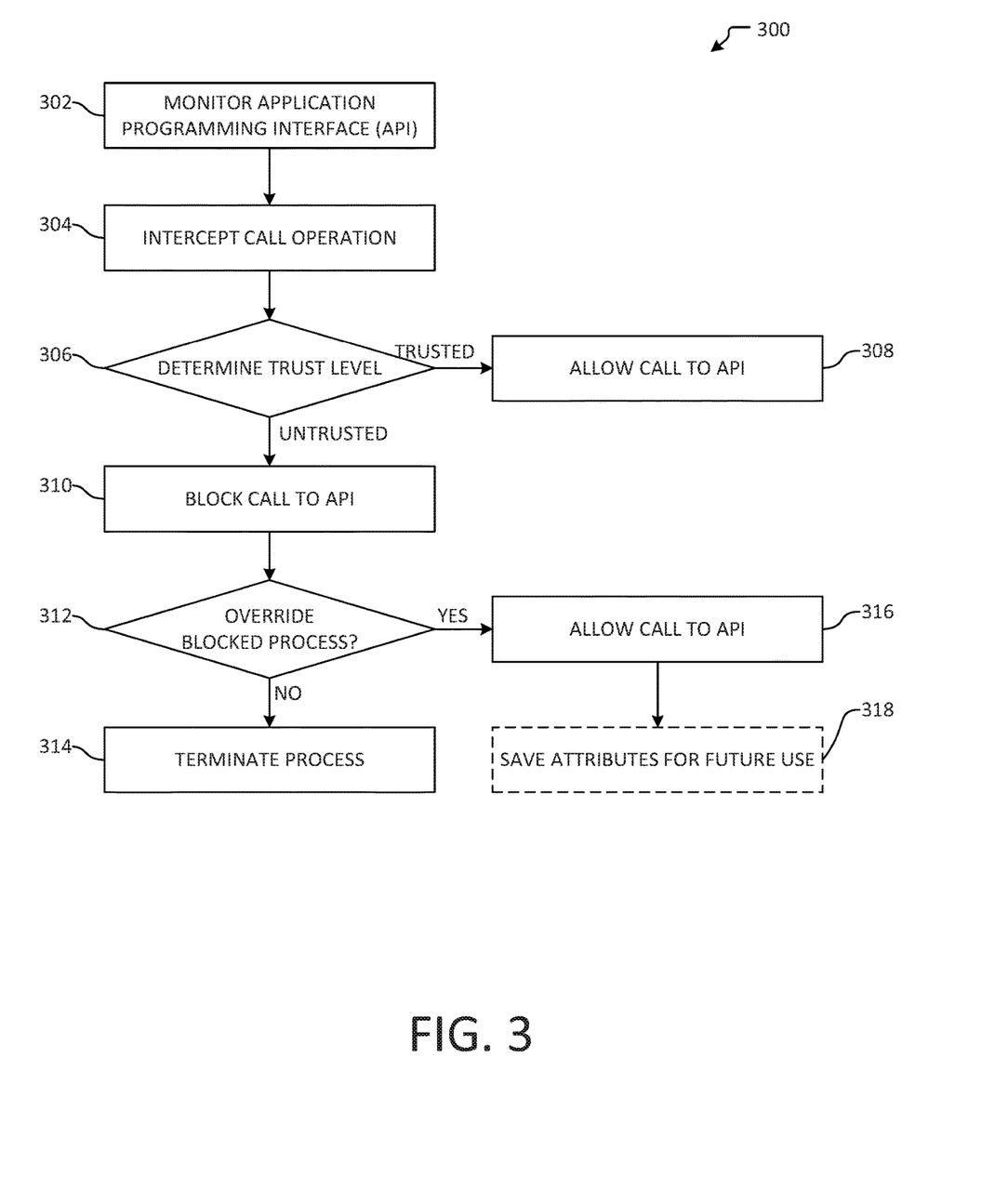
FIG. 3 illustrates an overview of an example method for restricting use of an API.

FIG. 3 illustrates an overview of an example method 300 for restricting use of an API. In an example, method 300 may be performed by a computing device. In another example, method 300 may be performed by security service 110 in FIG. 1. Method 300 begins at operation 302, where an API associated with an operating system may be monitored, such as by API monitoring processor 124 in FIG. 1. In an example, the API may be associated with file system functionality as described herein. In other examples, one or more API hooks may be placed on APIs (e.g., for processes running in user mode, in kernel mode, or any combination thereof) of the system, such that calls to the APIs by processes may be monitored, intercepted, and/or evaluated.

Moving to operation 304, a call operation directed to the API is intercepted. In an example, the call operation may include or be associated with a call stack associated with a process, such as processes 116, 118 in FIG. 1. In some examples, an API hook may intercept call operations directed to a find file API, among other APIs, so that processes calling the APIs may be evaluated for a trust level. In other examples, after interception of the call operation, the call stack associated with the call may be analyzed to determine whether the process should be subject to additional evaluation. For example, call stack parameters, such as parameters 208 in FIG. 2, may be analyzed for a file search operation that includes a wildcard (e.g., an asterisk (*), a question mark (?), etc.). Typically, malicious processes search for files based on wildcard operators so as to be able to access all files on the user's system. As such, file operations that include a wildcard operator may receive additional evaluation based on a trust level. In examples, this process enables method 300 to reduce the number of false-positives that may be generated when legitimate processes (e.g., file save-as dialogs, file open dialogs, etc.) call the hooked file search APIs.

At determination 306, a trust level associated with the process that called the file search API may be determined. In an example, the determination 306 may include evaluating the process based on one or more criteria as described in greater detail below with respect to FIG. 4. Example criteria include, but are not limited to, trustworthiness of the process (e.g., based on historical data whether the process can be considered trusted or untrusted, etc.), call stack attributes (e.g., return addresses, call instructions, pointers, etc.), security certificates associated with the process, and the like. While method 300 is described with respect to "trusted" and "untrusted" trust levels, it will be appreciated that any of a variety of other trust levels may be used. For example, a trust level may comprise a score comparable to a threshold, a set of values or flags, etc. If it is determined that the process calling the API is trusted, flow branches "TRUSTED" to operation 308, where the call to the API is allowed according to aspects described herein. In some examples, when the call operation is allowed, no indication may be provided to the user. Method 300 terminates at operation 308.

If, however, it is determined that the process calling the API is untrusted, flow branches "UNTRUSTED" to operation 310. At operation 310, the call to the API may be blocked. In examples, blocking the API call may comprise suspending execution of the process or returning execution to the process without performing the API call, among other examples. In other examples, in response to the blocked call operation, it may be determined at determination 312 whether to override the blocked process and allow the call to proceed. For example, the determination 312 may include a prompt that is presented to a user, such that the user may provide a user indication as to whether to allow the blocked process to call the API. In some examples, the prompt to the user may also provide information regarding the process and/or the call operation that was blocked. For example, the prompt may include information about the type of files being searched (e.g., *.docx or *.xlsx), the name of the process calling the API, aspects used to determine the trust level, or any other information as required or desired as to indicate why the process is being blocked.

If, at the determination 312, it is determined not to override the blocked process, flow branches "NO" to operation 314, where the blocked process may be terminated. In examples, information associated with the process may be reported back to the security service for further processing (e.g., a stack trace, a crash dump, a signature associated with the process, etc.). In such scenarios, this process reporting may be used to at least partially populate a list of known processes and the trust level of such processes, such as in process data store 120 in FIG. 1. In other examples, the process may not be terminated and may instead be permitted to continue execution. In such examples, execution of the process may be unstable or unpredictable as a result of the failed call to the API intercepted at operation 304. In another example, a prompt may be presented to the user, such that the user may provide an indication as to whether the process should be terminated. Thus, it will be appreciated that aspects of operation 314 may be automatic, may receive manual input, or may be any combination thereof. Method 300 terminates at operation 314.

If, however, it is determined at the determination 312 that the blocked process is to be overridden, flow instead branches "YES" to operation 316, where the call to the API may be allowed according to aspects described herein. In some examples, flow terminates at operation 316. In other examples, when the blocked process is overridden by the user, the user may be presented with another prompt with which the user may indicate whether to allow the API call by the process only once, or whether to allow the API call and save attributes associated with the call operation and/or the process for reference when evaluating future API calls. In examples, if the user elects to save such attributes, flow progresses to operation 318, where attributes associated with the call operation and/or the process may be saved for future use. For example, such attributes may be added to a list of known processes and associated with a trust level of such processes, such as in process data store 120 in FIG. 1. By allowing the user to whitelist desired processes, such processes may more easily be allowed to execute within the system. Additionally or alternatively, the attributes directed to the call operation may be added to a list of known call operation and the trust level of such call operations, such as in call operation data store 122 in FIG. 1. This enables the process to call the APIs in future occurrences without being blocked. Operation 318 is illustrated using a dashed box to indicate it is an optional step and may be omitted in some examples. Method 300 terminates at operation 318.

Figure 4:
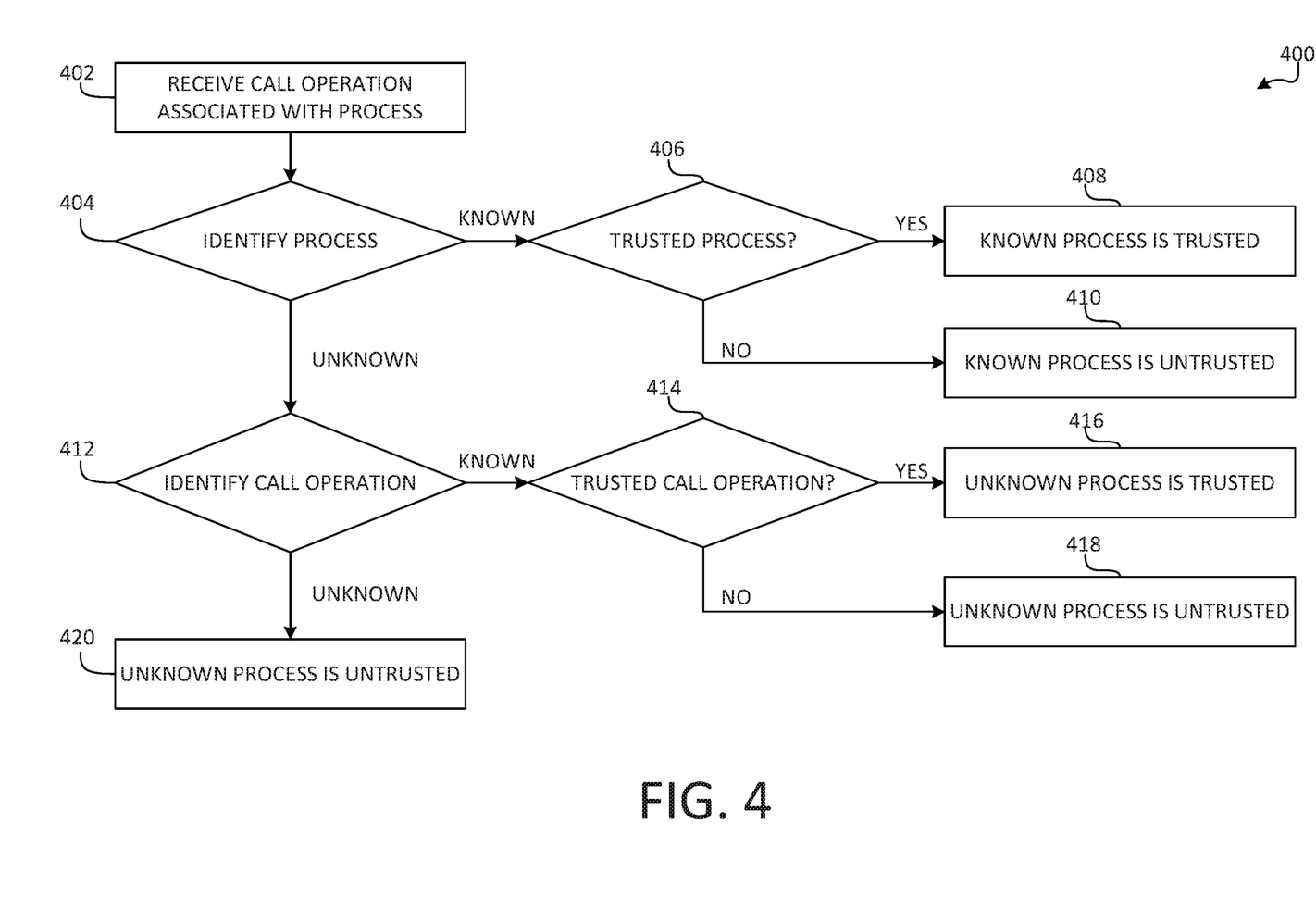
FIG. 4 illustrates an overview of an example method for determining a trust level of a process associated with a call operation.

FIG. 4 illustrates an overview of an example method 400 for determining a trust level of a process associated with a call operation. In an example, method 400 may be performed by a computing device. In another example, method 400 may be performed by security service 112 in FIG. 1. In some examples, aspects of method 400 may be performed at operation 306 of method 300, as discussed above with respect to FIG. 3. Method 400 begins at operation 402, where a call operation associated with a process is received for evaluation. In an example, an API hook may intercept a call operation by a process to a find file API (e.g., as may occur by API monitoring processor 124 in FIG. 1). In another example, the intercepted call operation may be analyzed for a file search operation that includes a wildcard (e.g., an asterisk (*), a question mark (?)) for further evaluation of a trust level.

Flow progresses to determination 404, where it may be determined whether the process calling the API is known to the security service (e.g., security service 110 in FIG. 1). The determination 404 may include accessing a process data store, such as process data store 120 in FIG. 1, to compare one or more attributes of the process to a set of known processes and identify whether the process is a known process. For example, the process calling the API may be associated with one or more process attributes, such as a name, hash, cryptographic signature, or other identifier. These attributes can be compared to a list of historical processes such that the process may be identified by the security service.

If it is determined that the process is known, flow branches "KNOWN" to determination 406, where it may be determined whether the known process calling the API is trustworthy. As an example, a known process may be associated with a trust level (e.g., trusted or untrusted, a score, etc.) which may be stored by and/or accessed from a process data store. As such, a trust level for the process calling the API may be determined based on the stored historical data. If it is determined that the process can be trusted, flow branches "YES" to operation 408, where it may be indicated (e.g., to determination 306 in FIG. 3) that the process is trusted. Accordingly, the process may be allowed to call the API, as discussed above. If, however, it is determined that the process cannot be trusted, flow instead branches "NO" to operation 410, where it may be indicated that the process is untrusted. Accordingly, the call to the API by the process may be blocked from calling the API, as discussed above.

Turning back to determination 404, if it is determined that the process calling the API is unknown, flow branches "UNKNOWN" to determination 412, where it may be determined whether an aspect of the call operation from the process is known to the security service. The determination 412 may include accessing a call operation data store, such as call operation data store 122 in FIG. 1, to compare one or more attributes of a call stack, such as call stack 202 in FIG. 2, to a set of known call operation attributes. Accordingly, the attributes may be used to determine whether the call operation is a known call operation. For example, a call operation to an API may be associated with one or more call stack attributes or a security certificate, among other things. These attributes can be compared to known historical call operations, such that the call operation from the process may be identified by the security service.

If it is determined that the call operation of the process is known, flow branches "KNOWN" to determination 414, where it may be determined whether the call operation is trustworthy. As an example, a trust level may be determined for the call operation based on information that is stored by and/or accessed from a call operation data store. As such, the trust level of the call operation may be looked up or otherwise determined based on such historical data. If it is determined that the call operation can be trusted, flow branches "YES" to operation 416, where it may be indicated that the process is trusted, based at least in part on the call operation attributes. As discussed above, the call to the API may be subsequently allowed. If, however, it is determined that the call operation cannot be trusted, flow instead branches "NO" to operation 418, where it may be indicated that the process is untrusted, based at least in part on the call operation attributes. Accordingly, the call to the API may be blocked according to aspects described herein.

Returning to determination 412, if it is determined that the call operation is unknown, flow instead branches "UNKNOWN" to operation 420, where it may be indicated that the process is untrusted, based at least in part on the attributes being unknown by the security service. As described above, the indication may then be used in method 300 (shown in FIG. 3) such that the call operation may be blocked, thereby preventing the process from calling the API. Method 400 terminates at operations 408, 410, 416, 418, and/or 420.

Figure 5:
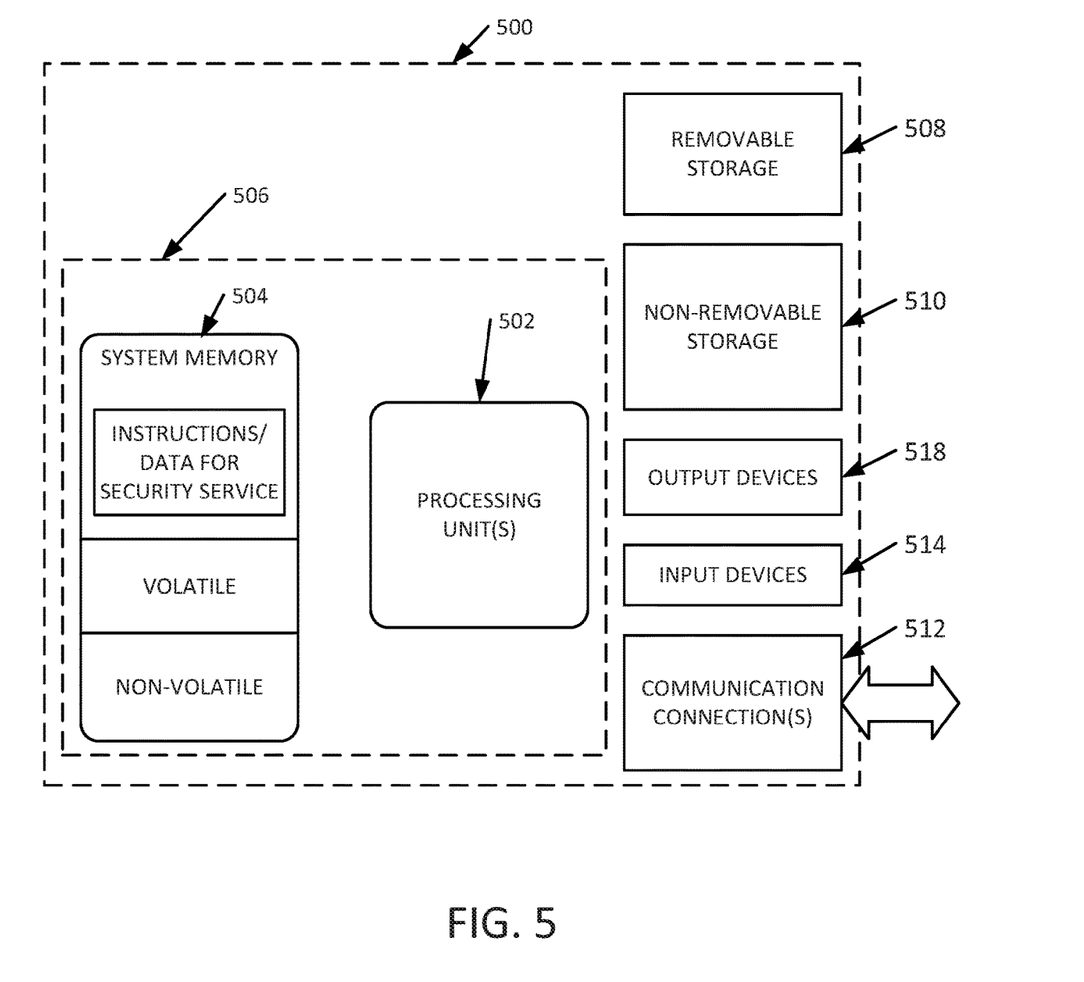
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, process information, call operation information, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operation. The set of operations comprises: monitoring at least one application programming interface (API) associated with performing one or more file finding functions; intercepting a call operation directed to the at least one API, wherein the call operation is associated with a process attempting to perform at least one of the one or more file finding functions; determining a trust level for the process; evaluating the determined trust level to determine whether the process is trusted or untrusted; and based on determining the process is untrusted, blocking the call operation directed to the at least one API from performing the at least one of the one or more file finding functions. In an example, determining the trust level for the process comprises: accessing a process data store to compare one or more attributes of the process to information for a set of known processes to determine whether the process is a known process; and based on determining that the process is a known process, determining whether the known process is untrusted. In another example, determining the trust level for the process comprises: accessing a process data store to compare one or more attributes of the process to information for a set of known processes to determine whether the process is an unknown process; accessing a call operation data store to compare one or more attributes of the call operation to information for a set of known call operation attributes to determine whether the call operation is untrusted; and determining the trust level for the process based at least in part on the determination whether the process is an unknown process and the determination whether the call operation is untrusted. In a further example, blocking the call operation further comprises displaying a prompt to override the blocked process and allow the call operation. In yet another example, the set of operations further comprises: in response to receiving a user indication at the displayed prompt to allow the call operation, adding the process to a set of known processes in a process data store. In a further still example, the set of operations further comprises: in response to receiving a user indication at the displayed prompt to deny the call operation, terminating the process. In another example, the prompt includes information relating to the at least one of the one or more file finding functions of the API. In a further example, intercepting the call operation comprises analyzing a call stack associated with the process for an operation having a wildcard character.

In another aspect, the technology relates to a method of restricting use of an application programming interface (API) associated with performing one or more file finding functions. The method comprises: receiving a call operation directed to an API associated with performing one or more file finding functions, wherein the call operation is associated with a process; performing an evaluation of the process based on the call operation, wherein the evaluation comprises at least one of: comparing one or more attributes of the process to a set of known processes; and comparing one or more attributes of the call operation to a set of known call operations; determining, based at least in part on the evaluation, a trust level for the process; evaluating the determined trust level to determine whether the process is trusted or untrusted; and based on determining that the process is untrusted, blocking the call operation directed to the API from performing at least one of the one or more file finding functions. In an example, in response to blocking the call operation, the method further comprises overriding the call operation blocking with at least one action selected from the group consisting of: allowing the call operation and adding the process to the set of known processes; and allowing the call operation only once. In another example, in response to blocking the call operation, the method further comprises: capturing information associated with the process; and reporting the process back to a security service. In a further example, the API is associated with a user-mode of the operating system.

In a further aspect, the technology relates to a method of restricting use of at least one application programming interface (API). The method comprises: monitoring at least one API associated with performing one or more file finding functions; intercepting a call operation directed to the at least one API, wherein the call operation is associated with a process attempting to perform at least one of the one or more file finding functions; determining a trust level for the process; evaluating the determined trust level to determine whether the process is trusted or untrusted; and based on determining the process is untrusted, blocking the call operation directed to the at least one API from performing the at least one of the one or more file finding functions. In an example, determining the trust level for the process comprises: accessing a process data store to compare one or more attributes of the process to information for a set of known processes to determine whether the process is a known process; and based on determining that the process is a known process, determining whether the known process is untrusted. In another example, determining the trust level for the process comprises: accessing a process data store to compare one or more attributes of the process to information for a set of known processes to determine whether the process is an unknown process; accessing a call operation process data store to compare one or more attributes of the call operation to information for a set of known call operation attributes to determine whether the call operation is untrusted; and determining the trust level for the process based at least in part on the determination whether the process is an unknown process and the determination whether the call operation is untrusted. In a further example, blocking the call operation further comprises displaying a prompt to override the blocked process and allow the call operation. In yet another example, the method further comprises: in response to receiving a user indication at the displayed prompt to allow the call operation, adding the process to a set of known processes in a process data store. In a further still example, the method further comprises: in response to receiving a user indication at the displayed prompt to deny the call operation, terminating the process. In another example, the prompt includes information relating to the at least one of the one or more file finding functions of the API. In a further example, intercepting the call operation comprises analyzing a call stack associated with the process for an operation having a wildcard character.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for determining a trust level of a process associated with a call operation, comprising:
   a processor; and
   memory storing instructions that, when executed by the processor, causes the system to perform a set of operations, the set of operations comprising:
      receiving a call operation associated with a process, the call operation having an associated call stack that stores a return address for the call operation;
      responsive to receiving the call operation associated with the process, determining whether the process is known by a security service;
      after receiving the call operation associated with the process and determining whether the process is known by a security service:
         responsive to determining that the process is known by the security service, determining a trust level for the process and responsive to determining that the process is both known and trusted based on the trust level for the process, allowing the known process to execute the call operation;
         responsive to determining that the process is unknown by the security service, determining whether the call operation is known by the security service, comprising accessing a data store to analyze the call stack;
         responsive to determining that the process is unknown by the security service and that the call operation is known by the security service, evaluating the trust level of the call operation and responsive to determining that the called operation is both known and trusted based on the trust level of the call operation, trusting the unknown process and executing the call operation; and
         responsive to determining that the process is unknown by the security service and that the call operation is unknown by the security service, not trusting the process and not executing the call operation.

2. The system of claim 1, wherein the call operation is that of an application programming interface (API) and an API hook is used to intercept the call operation.

3. The system of claim 2, wherein the process comprises a process to find a file, the trust level evaluated for a file search operation that comprises a wildcard symbol.

4. The system of claim 1, wherein determining whether the process is known by the security service comprises accessing a data store to compare attributes of the process to a set of attributes for known processes.

5. The system of claim 4, wherein the set of attributes for known processes comprises a list of historical data for known processes and comparing attributes comprises comparing a process name, a process hash, or a process cryptographic signature to the historical data for known process.

6. The system of claim 1, wherein determining whether the call operation is known by the security service comprises accessing the data store to compare attributes of the call stack for the call operation to a set of attributes for known call operations.

7. The system of claim 6, wherein the set of attributes for known call operations comprises historical data for known call operation including a security certificate and comparing attributes comprises comparing a security certificate for the call operation to the historical data for known call operations.

8. The system of claim 1, wherein determining the trust level of the process includes accessing the data store to evaluate the call stack associated with the process, including evaluating a call stack attribute stored in the call stack.

9. A method for determining a trust level of a process associated with a call operation, comprising:
  receiving a call operation associated with a process, the call operation having an associated call stack that stores a return address for the call operation;
  responsive to receiving the call operation associated with the process, determining whether the process is known by a security service;
  after receiving the call operation associated with the process and determining whether the process is known by a security service:
    responsive to determining that the process is known by the security service, determining the trust level for the process and responsive to determining that the process is both known and trusted based on the trust level for the process, allowing the known process to execute the call operation;
    responsive to determining that the process is unknown by the security service, determining whether the call operation is known by the security service, including accessing a data store to analyze the call stack;
    responsive to determining that the process is unknown by the security service and that the call operation is known by the security service, evaluating the trust level of the call operation and responsive to determining that the called operation is both known and trusted based on the trust level of the call operation, trusting the unknown process and executing the call operation; and
    responsive to determining that the process is unknown by the security service and that the call operation is unknown by the security service, not trusting the process and not executing the call operation.

10. The method of claim 9, wherein the call operation is that of an application programming interface (API) and an API hook is used to intercept the call operation.

11. The method of claim 10, wherein the process comprises a process to find a file, the trust level evaluated for a file search operation that comprises a wildcard symbol.

12. The method of claim 9, wherein determining whether the process is known by the security service comprises accessing a data store to compare attributes of the process to a set of attributes for known processes.

13. The method of claim 12, wherein the set of attributes for known processes comprises a list of historical data for known processes and comparing attributes comprises comparing a process name, a process hash, or a process cryptographic signature to the historical data for known process.

14. The method of claim 9, wherein determining whether the call operation is known by the security service comprises accessing the data store to compare attributes of the call stack for the call operation to a set of attributes for known call operations.

15. The method of claim 14, wherein the set of attributes for known call operations comprises historical data for known call operation including a security certificate and comparing attributes comprises comparing a security certificate for the call operation to the historical data for known call operations.

16. The method of claim 9, wherein determining the trust level of the process includes accessing the data store to evaluate the call stack associated with the process, including evaluating a call stack attribute stored in the call stack.

17. A computer storage device storing a set of computer-executable instructions that, when executed, are capable of performing a method for determining a trust level of a process associated with a call operation, the set of computer-executable instructions comprising instructions for:
  receiving a call operation associated with a process, the call operation having an associated call stack that stores a return address for the call operation;
  responsive to receiving the call operation associated with the process, determining whether the process is known by a security;
  after receiving the call operation associated with the process and determining whether the process is known by a security service:
    responsive to determining that the process is known by the security service, determining the trust level for the process and responsive to determining that the process is both known and trusted based on the trust level for the process, allowing the known process to execute the call operation;
    responsive to determining that the process is unknown by the security service, determining whether the call operation is known by the security service, including accessing a data store to analyze the call stack;
    responsive to determining that the process is unknown by the security service and that the call operation is known by the security service, evaluating the trust level of the call operation and responsive to determining that the called operation is both known and trusted based on the trust level of the call operation, trusting the unknown process and executing the call operation; and
  responsive to determining that the process is unknown by the security service and that the call operation is unknown by the security service, not trusting the process and not executing the call operation.

18. The computer storage device of claim 17, wherein the call operation is that of an application programming interface (API) and an API hook is used to intercept the call operation.

19. The computer storage device of claim 17, wherein determining whether the process is known by the security service comprises accessing a data store to compare attributes of the process to a set of attributes for known processes.

20. The computer storage device of claim 19, wherein the set of attributes for known processes comprises a list of historical data for known processes and comparing attributes comprises comparing a process name, a process hash, or a process cryptographic signature to the historical data for known process.

21. The computer storage device of claim 17, wherein determining whether the call operation is known by the security service comprises accessing a data store to compare attributes of the call stack for the call operation to a set of attributes for known call operations.

22. The computer storage device of claim 21, wherein the set of attributes for known call operations comprises historical data for known call operation including a security certificate and comparing attributes comprises comparing a security certificate for the call operation to the historical data for known call operations.

23. The computer storage device of claim 17, wherein determining the trust level of the process includes accessing the data store to evaluate the call stack associated with the process, including evaluating a call stack attribute stored in the call stack.

* * * * *